(12) United States Patent
Adonyi et al.

(10) Patent No.: US 9,808,879 B2
(45) Date of Patent: Nov. 7, 2017

(54) WELDING DIAGNOSTIC DEVICE FOR IDENTIFYING METAL TRANSFER MODES DURING A WELDING PROCESS AND A METHOD OF IDENTIFYING METAL TRANSFER MODES OF A WELDING PROCESS

(71) Applicant: ISAWE, LLC, Longview, TX (US)

(72) Inventors: Yoni Adonyi, Longview, TX (US); Joseph Russell, Hallsville, TX (US); Derek S. Hoyt, Ackley, IA (US); Nathan Berthiaume, New Braunfels, TX (US)

(73) Assignee: ISAWE, LLC, Longview, TX (US)

( * ) Notice: Subject to any disclaimer, the term of this patent is extended or adjusted under 35 U.S.C. 154(b) by 148 days.

(21) Appl. No.: 14/250,158

(22) Filed: Apr. 10, 2014

(65) Prior Publication Data

US 2014/0305911 A1 Oct. 16, 2014

Related U.S. Application Data

(60) Provisional application No. 61/811,494, filed on Apr. 12, 2013.

(51) Int. Cl.
*B23K 9/10* (2006.01)
*B23K 9/095* (2006.01)

(52) U.S. Cl.
CPC .................. *B23K 9/0953* (2013.01)

(58) Field of Classification Search
CPC .............. B23K 9/095; B23K 9/0953

USPC .......... 219/74, 121.54, 130.1, 130.21, 130.5, 219/137 PS
See application file for complete search history.

(56) References Cited

U.S. PATENT DOCUMENTS

| 4,103,141 A | 7/1978 | Wristen | |
|---|---|---|---|
| 4,546,234 A | 10/1985 | Ogasawara et al. | |
| 4,605,836 A | 8/1986 | Retfalvi et al. | |
| 5,221,825 A * | 6/1993 | Siewert | B23K 9/1062 219/130.01 |
| 5,349,156 A | 9/1994 | Madigan et al. | |
| 5,369,243 A * | 11/1994 | Kramer | B23K 9/1043 219/130.1 |
| 5,521,354 A | 5/1996 | Ludewig et al. | |
| 5,756,967 A | 5/1998 | Quinn et al. | |
| 8,389,897 B2 | 3/2013 | Sardy et al. | |
| 2007/0102407 A1* | 5/2007 | Uezono | B23K 9/0731 219/130.33 |

(Continued)

FOREIGN PATENT DOCUMENTS

| JP | 03052772 A * 3/1991 |
|---|---|
| WO | 2008151393 A1 12/2008 |
| WO | WO 2008151393 A1 * 12/2008 |

*Primary Examiner* — Thien S Tran

(57) ABSTRACT

Provided herein is a welding diagnostic device, a method of identifying a metal transfer mode of a welding process presently being performed and a transfer mode identifier for use with a GMAW welding machine. In one embodiment, the welding diagnostic device includes: (1) a welding data interface configured to receive a welding voltage from a welding machine during a welding process and (2) a data acquisition system configured to, during the welding process, determine a metal transfer mode of the welding process based on the welding voltage and provide a sensory indication thereof.

19 Claims, 3 Drawing Sheets

(56) References Cited

U.S. PATENT DOCUMENTS

2011/0163072 A1* 7/2011 Vogel .................. B23K 9/0953
219/74

* cited by examiner

WELDING DIAGNOSTIC DEVICE FOR IDENTIFYING METAL TRANSFER MODES DURING A WELDING PROCESS AND A METHOD OF IDENTIFYING METAL TRANSFER MODES OF A WELDING PROCESS

CROSS-REFERENCE TO RELATED APPLICATION

This application claims the benefit of U.S. Provisional Application Ser. No. 61/811,494 filed on Apr. 12, 2013, entitled "REAL-TIME DIAGNOSTIC DEVICE FOR SHORT-CIRCUIT ARC TRANSFER MODE IN GAS METAL ARC WELDING-WELDER'S DIGITAL STETHOSCOPE," commonly assigned with this application and incorporated herein by reference.

GOVERNMENT LICENSE RIGHTS

This invention was made with government support under FHWA-RD-03-074 awarded by the Federal Highway R&D Labs. The government may have certain rights in the invention.

TECHNICAL FIELD

This application relates to welding and, more specifically, to identifying metal transfer modes when welding.

BACKGROUND

Different types of welding processes are used in various industries to join materials such as metals. Arc welding is one example of the different types of welding that uses an electric arc between an electrode and a base material to join materials. Different types of arc welding include shielded metal arc welding (SMAW), flux-cored arc welding (FCAW) gas tungsten arc welding (GTAW) and gas metal arc welding (GMAW). In contrast to some of the other conventional welding processes, GMAW uses a continuous wire feed that allows higher welding speeds compared to other conventional welding processes.

SUMMARY

In one aspect, the disclosure provides a welding diagnostic device for use with a welding machine during a welding process. In one embodiment, the welding diagnostic device includes: (1) a welding data interface configured to receive a welding voltage from a welding machine during a welding process and (2) a data acquisition system configured to, during the welding process, determine a metal transfer mode of the welding process based on the welding voltage and provide a sensory indication thereof.

In another aspect, a method of identifying a metal transfer mode of a welding process presently being performed is disclosed. In one embodiment, the method includes: (1) analyzing a welding voltage from a welding machine, (2) determining, employing a processor, a number of voltage drops of the welding voltage below a threshold and (3) identifying a metal transfer mode of a welding process performed by the welding machine based on the number of voltage drops.

In yet another aspect, a transfer mode identifier for use with a GMAW welding machine is disclosed. In one embodiment, the transfer mode identifier includes: (1) a welding data interface configured to receive a welding voltage from power terminals of the welding machine during a welding process, (2) a data acquisition system configured to, during the welding process, determine metal transfer modes of the welding process based on transitions of the welding voltage and (3) a viewable identifier configured to visually indicate the metal transfer modes during the welding process.

DETAILED DESCRIPTION

Figure 1:
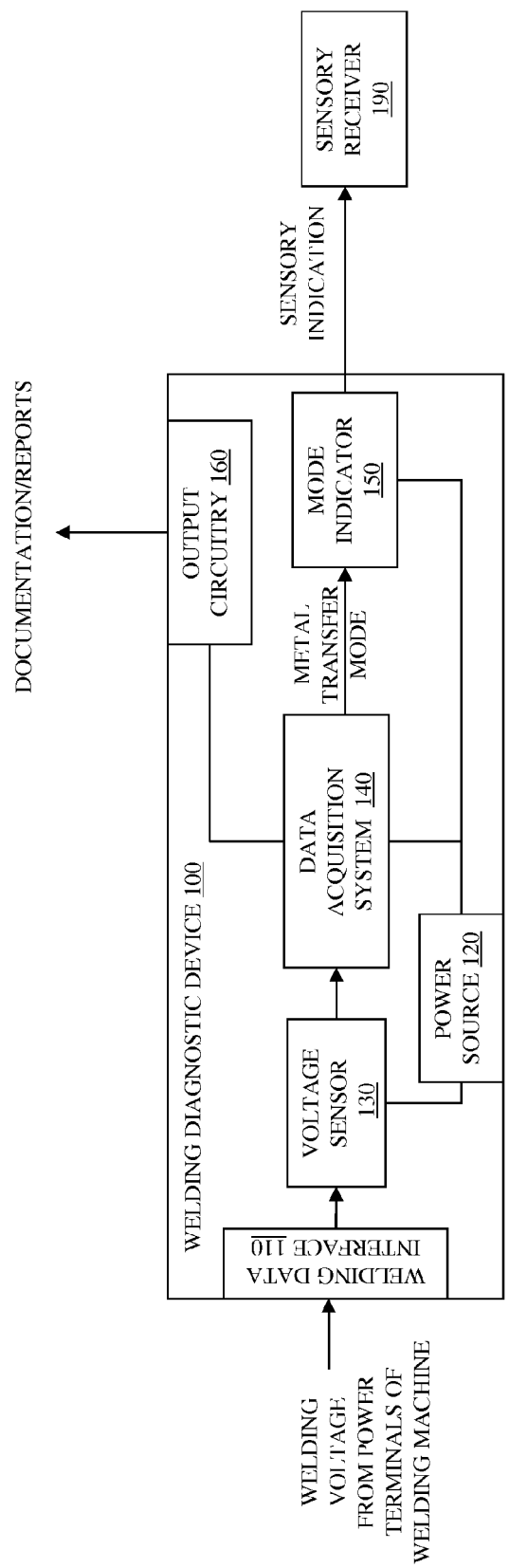
FIG. 1 illustrates a block diagram of an embodiment of a welding diagnostic device constructed according to the principles of the disclosure.

The three metal transfer modes typically associated with GMAW are globular, spray and short-circuit (SC). Other transfer modes, including pulsed-spray and modified SC, are also recognized variation of the three metal transfer modes. Regardless of the GMAW system, a SC transfer can occur and the sidewall fusion of the weld can be compromised, i.e., lack of fusion (LoF), when welding thick materials. As such, GMAW-SC is banned in different industries and states for some welding applications. Since metal transfer modes are difficult to establish without sophisticated monitoring equipment, most fabricators choose not to use the GMAW process even if GMAW is desired for welding thin materials. Instead, fabricators and manufacturers will settle for lower productivity and rely on higher skilled welders. Thus, even though a comparatively higher welding speed is possible, GMAW is often not employed due to the possibility of SC transfer mode welds.

It is realized herein that the usage of GMAW can be increased if the SC transfer mode can be easily identified during the GMAW process. This can be advantageous when the SC transfer mode is not desired, such as with thick materials, and also when SC transfer mode is desired, such as when welding thinner materials. Thus, instead of employing sophisticated monitoring equipment and/or post-welding analysis to determine the occurrence of an SC transfer mode, it is realized herein that an apparatus, method and/or system that more easily identifies an SC transfer mode would be advantageous; especially if this can be done in real time. Real time as used herein is the actual time during which a welding process is happening; the actual time of occurrence.

Accordingly, the disclosure provides a diagnostic device and scheme that identifies the metal transfer mode of a welding process based on the welding voltage of the welding machine employed. In one embodiment, the disclosure provides an apparatus and method of identifying a SC metal transfer mode through analysis of only a welding machine's arc voltage, such as a GMAW machine's arc voltage. The apparatus and method can also be employed to identify a metal transfer mode when using FCAW as well as GMAW using Metal Cored wire.

The disclosed diagnostic device can be simply and easily set-up for operation by connecting leads to the power terminals of the welding machine to receive the welding voltage. The simple set-up may also include connecting the diagnostic device to a power source to receive operating power. Thus, in contrast to conventional welding monitoring equipment, the set-up time and complexity is minimal.

The diagnostic device can be a portable device of compact construction ensuring mobility. The size and shape of the diagnostic device can vary depending on the need of the user. In some embodiments the diagnostic device is a portable device weighing less than a pound. In one embodiment, the diagnostic device is a portable box having a handle for carrying. In other embodiments, the diagnostic device can be sized to clip onto the belt of a welder. Regardless the size, the diagnostic device can be enclosed within a case to allow operation in harsh industrial environments. In some embodiments, the rugged case contains a dedicated power source in addition to the sensory hardware. Alternatively, the diagnostic device can be implemented as a distributed system wherein a portion of the diagnostic device is implemented on a computing device such as a laptop, a smartphone, a computing pad or a desktop. A display or a speaker of the computing device can provide at least one sensory indication of a metal transfer mode or modes.

The diagnostic device is capable of real-time analysis of a welding machine's metal transfer modes during a welding process. In one embodiment, the welding machine is a Constant Voltage (CV) GMAW machine. In some embodiments, the diagnostic device is operable with any type of CV GMAW machine. Thus, regardless of manufacturer, the disclosed diagnostic device provides a universal tool that is easy to set-up and employable in industrial environments. Additionally, the diagnostic device can provide a sensory indication or indications of the type of metal transfer mode. In one embodiment, the sensory indication is a visual indication, an audible indication, a vibratory indication, or any combination thereof. As such, the disclosed diagnostic device can provide real time feedback for the welder or others observing the welding process. In some embodiments, sensory indications, including different types of sensory indications, can be simultaneously sent to multiple people during the welding process. In addition to the welder or observers, the sensory indications and other live weld data may be wirelessly transmitted to a remote server for further evaluation.

Turning now to the figures, FIG. 1 illustrates a block diagram of an embodiment of a welding diagnostic device 100 constructed according to the principles of the disclosure. The welding diagnostic device 100 includes a welding data interface 110, a power source 120, a voltage sensor 130, a data acquisition system (DAS) 140, a mode indicator 150 and output circuitry 160.

The welding data interface 110 is configured to receive a welding voltage from a welding machine. The welding voltage is a continuous voltage stream received from the power supply of a welding machine during a welding process. The welding data interface 110 can include conventional connectors for mechanically and electrically coupling leads to the power connections of the welding machine power supply. The leads can be conventional leads having spring-loaded clamps for easily connecting to the positive and negative power supplies of the welding machine. The negative power supply is typically the ground that is also connected to materials being welded together by the welding process.

The power source 120 is configured to provide power for the various components of the diagnostic device 100. In some embodiments, the power source 120 is a battery. As such, the diagnostic device 120 can contain its own power source. In other embodiments, the power source 120 provides a connection to a source of power that is external to the diagnostic device 100. The external power source can be from a utility company via a typical wall outlet or from an external battery. The power source 120 includes the necessary circuitry and connections to couple the diagnostic device 100 to a source of power and transform the received power if needed. In some embodiments, the diagnostic device 100 is configured to operate employing an AC voltage of 115 volts, a battery powered DC voltage of 30 volts or both. The power provided by the power source 120 can vary depending on the embodiment. For example, in some embodiments the power source 120 can provide an operating voltage that is typically employed in smart phones.

The voltage sensor 130 is configured to receive the welding voltage from the welding data interface 110, read the received voltage and provide the voltage to the DAS 140. The voltage sensor 130, the welding data interface 110 and the power source 120 can be conventional devices.

The DAS 140 is configured to receive the welding voltage from the voltage sensor 130, analyze the received voltage values and determine the metal transfer mode of the welding process based on the welding voltage. The DAS 140 is further configured to generate a mode signal to indicate the determined metal transfer mode and provide it to the mode indicator 150. The mode signal is a data signal recognized by the mode indicator 150 to correspond to a particular metal transfer mode. The mode indicator 150 employs the received mode signal to provide a sensory indication of the determined metal transfer mode.

The DAS 140 includes a processor and a memory having stored thereon a series of operating instructions that direct the operation of the processor when initiated to determine the metal transfer mode of a welding process. The DAS 140 determines metal transfer modes by analyzing the welding voltage, which can be represented as a waveform of voltage over time, and comparing the welding voltage to a threshold. In one embodiment, the DAS 140 determines the metal transfer mode based on the number of times the welding voltage crosses or drops below a threshold per a designated amount of time, e.g, within a time window. In one embodiment, the designated amount of time is a second. The threshold can be a predetermined threshold based on experimental or statistical data. As such, the predetermined threshold can be an experimentally determined constant based on material type, thickness, and welding consumable. The DAS 140 sums the total number of drops and compares this summation to experimentally determined ranges that are used to classify various metal transfer modes. For example, considering detection of a SC mode, a threshold can be established and used to detect the number of "shorts" (when a voltage theoretically drops to zero volts) that occur within a designated amount of time. In this example, the amount of time is a second. A summation of the number of shorts per second are compared to the ranges that classifies the summation of shorts per second (Hz) as a particular metal transfer mode: <1=spray mode, 1-19=globular mode, and 20<=SC mode.

In another embodiment, the threshold used for comparison is a percentage of the average welding voltage. The average welding voltage can be calculated by summing every voltage data point along one second's worth of data from the welding voltage waveform and then dividing by a quantity of data points. In one embodiment, fifty percent of the average welding voltage is used as a threshold. The DAS 140 compares the number of drops below this calculated threshold per an amount of time to a set of predetermined ranges, each of which classifies this quantity of drops per time amount as a particular transfer mode. The number of drops per time amount can be used to indicate the number of shorts per Hz and the predetermined ranges identifying the number of shorts per second as a particular metal transfer mode.

Figure 3:
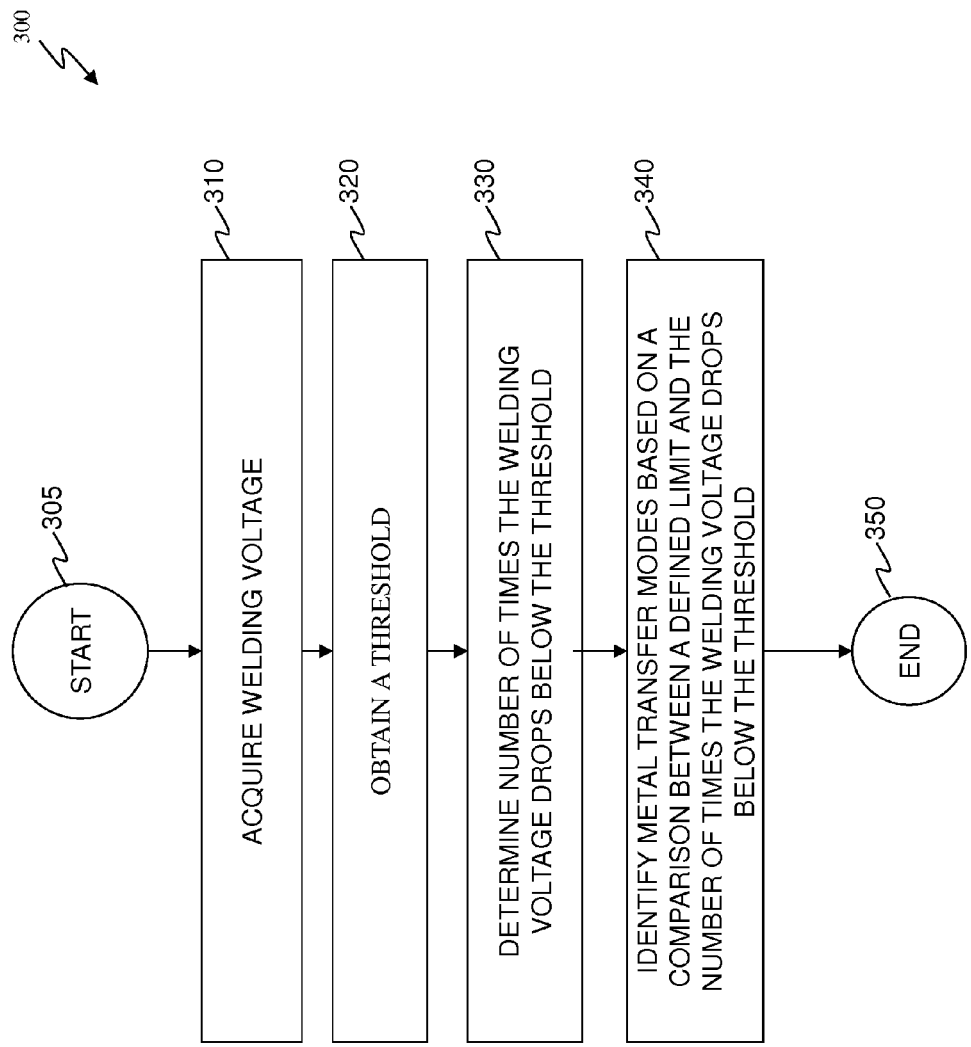
FIG. 3 illustrates an embodiment of a method of determining a metal transfer mode of a welding process carried out according to the principles of the disclosure.

In one embodiment, the DAS 140 is configured to determine metal transfer modes according to the method disclosed in FIG. 3. The DAS 140 can be used to indicate multiple types of metal transfer modes, a desired metal transfer mode or modes or a metal transfer mode or modes that are not desired. In some embodiments, a sensory indication may only be provided for a specific metal transfer mode that is either desired or unwanted.

Figure 2:
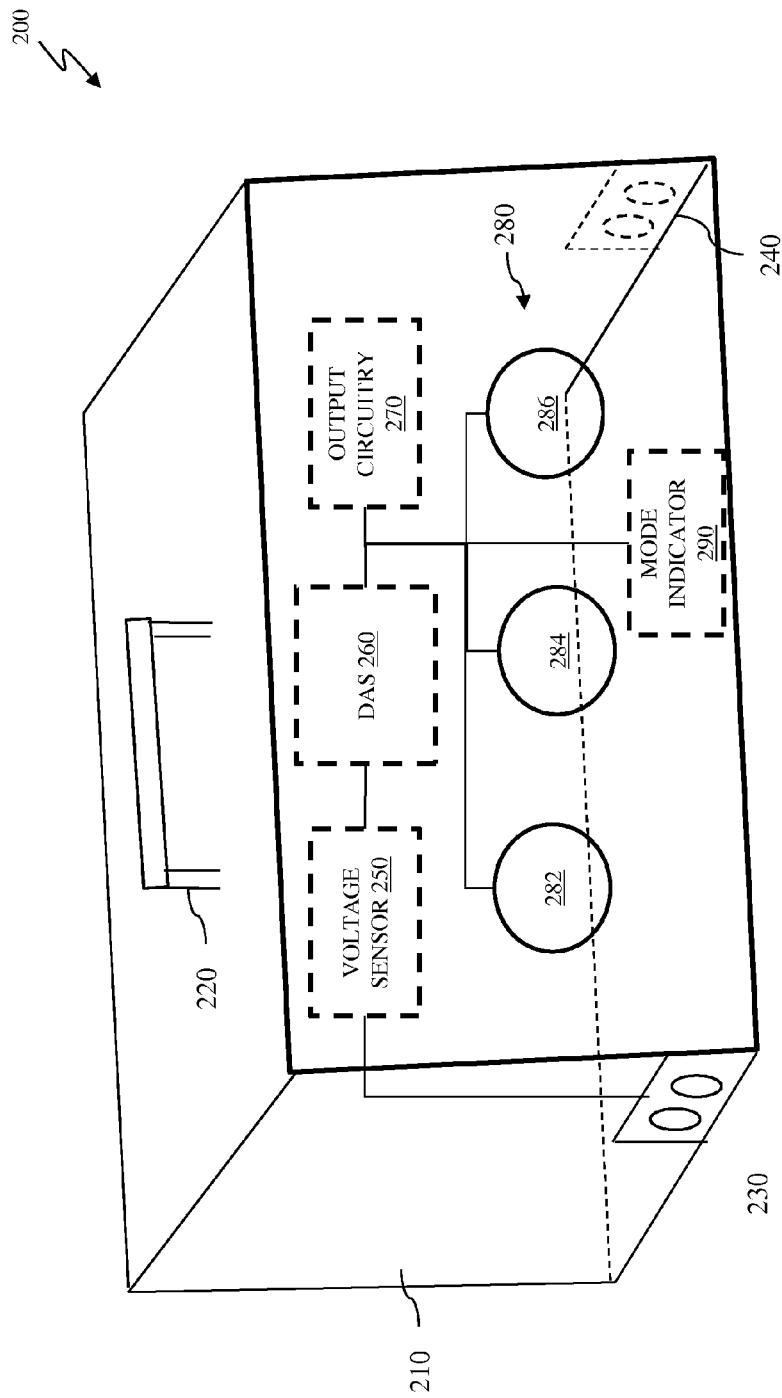
FIG. 2 illustrates a diagram of an embodiment of a transfer mode identifier constructed according to the principles of the disclosure.

As noted above, the mode indicator 150 is configured to provide a sensory indication of the metal transfer mode based on the mode signal. The mode indicator 150 can be a viewable identifier that provides a visual indication of the type of metal transfer mode. In one embodiment, the viewable identifier is a light that is turned-on when a particular metal transfer mode is identified. For example, the welding machine may be a CV GMAW machine and the DAS 140 determines the welding voltage corresponds to a SC metal transfer mode. As such the DAS 140 generates a mode signal that indicates a SC transfer mode and activates the light to provide a visual indication that the metal transfer mode is a SC transfer mode. Alternatively, the viewable identifier is a light that is turned-on when a particular metal transfer mode is not identified. As such the DAS 140 can generate a mode signal that indicates the metal transfer mode is not a SC mode and activates the light to provide such a visual indication. In some embodiments, two lights can be employed to provide a Go/No Go embodiment. In this embodiment, a red light can be used to indicate the metal transfer mode is SC and a green light can be used to indicate the metal transfer mode is not SC. In some embodiments, the mode indicator 150 may include more lights of different colors wherein each color uniquely corresponds to a type of metal transfer mode. FIG. 2 provides such an embodiment.

The mode indicator 150 can also provide an audible indication of a metal transfer mode or of multiple metal transfer modes. Different sounds can uniquely correspond to various metal transfer modes. For example, a first sound can identify a globular transfer mode, a second sound a SC transfer mode and a third sound a spray mode. In some embodiments, the mode indicator 150 can provide a sensory indication that is felt, such as a vibration, to indicate one or more metal transfer modes, e.g., SC, globular or spray.

The mode indicator 150 can provide more than one type of sensory indication. Additionally, the mode indicator 150 can provide the sensory indication or indications external to or remote from the diagnostic device via a wireless or wired connection. As such, the mode indicator 150 can include a transmitter, such as a Bluetooth transmitter, to wirelessly send the sensory indication to a receiver that is external to the diagnostic device 100. The receiver can be located within the welding helmet, a pocket or on a belt of the welder performing the welding process. Multiple receivers associated with various people, such as observers or supervisors, may be employed to receive sensory indications. In FIG. 1, a sensory receiver 190 is illustrated to represent a receiver or receivers configured to receive the sensory indication from the mode indicator 150.

In addition to generating a mode signal, the DAS 140 is also configured to generate reports from the analysis of the welding voltage. The reports can be stored and downloaded after the welding process is completed for analysis. The output circuitry 160 is configured to provide an interface for downloading the reports. The output circuitry 160 can be conventional circuitry or connections, such as a Universal Serial Bus (USB) connection. The output circuitry 160 is configured to provide an interface for communicating with the DAS 140. The output circuitry 160 can be used to download data or reports of the welding process for post-welding analysis. The output circuitry 160 can be conventional circuitry that is used to provide connections for downloads or uploads from and to the DAS 140. In addition to reports, the output circuitry 160 can be used to transmit live weld data, such as the metal transfer modes, to an external device such as a server. The live weld data can then be used for remote evaluation.

FIG. 2 illustrates a diagram of an embodiment of a transfer mode identifier (TMI) 200 constructed according to the principles of the disclosure. The TMI 200 is a portable, self-contained welding diagnostic device having a rigid case for use in harsh industrial environments. The TMI 200 includes a case 210, a handle 220, a welding data interface 230, a power source 240, a voltage sensor 250, a DAS 260, output circuitry 270 and a viewable identifier 280. The TMI 200 includes some of the same components as described above for the diagnostic device 100. For example, the welding data interface 230, the power source 240, the voltage sensor 250, the DAS 260 and the output circuitry 270 are configured to provide the same or substantially the same functionality as described above for their corresponding components of diagnostic device 100, i.e., the welding data interface 110, the power source 120, the voltage sensor 130, the DAS 140 and the output circuitry 160, respectively. In one embodiment, the TMI 200 is configured to determine the metal transfer modes of a GMAW machine.

The case 210 provides protection for the sensory equipment and the components of the TMI 200. The case is constructed of a metal, such as aluminum, and has a side that can be opened or removed to provide access to the components located within. In other embodiments, the case can be constructed of another material such as a thermoset polymer. As such, the case 210 includes a latch or latches to secure the removable side and/or a hinge; neither of which is illustrated in FIG. 2. The handle 220 allows easy portability and also can be used to open the top side of the case 210 for access. The welding data interface 230 and the power source 240 are externally accessible from the case 210. In some embodiments, the output circuitry 270 is also externally accessible.

The viewable identifiers 280 are lights that are used to provide a visual indication of the metal transfer mode that is occurring for the welding process that is currently being performed. The viewable identifiers 280 include three lights 282, 284, 286, of different colors with each of the colors uniquely associated with a metal transfer mode. In one embodiment for use with a GMAW machine, light 282 is red and associated with SC transfer mode, light 284 is yellow and associated with the glob transfer mode and light 286 is green and associated with the spray transfer mode. One skilled in the art will understand that the viewable identifiers 280 can be associated with other types of metal transfer modes and/or can employ different colors. Additionally, as noted above, the number of lights can vary and different configurations, such as a Go/No Go configuration, can be employed.

In addition to the viewable identifiers, the TMI 200 also includes a mode indicator 290 that provides audible identification of the metal transfer mode determined by the DAS 260. The mode indicator 290 can include a speaker for providing the audible identification locally and/or a transmitter for sending the audible identification or other type of sensory indication to a corresponding receiver. The corresponding receiver, for example, can be located on a welder, on an observer or both. The mode indicator 290 can be employed to simultaneously send various sensory indications, either wirelessly or wired, to multiple locations or people.

The TMI 200 is a portable, rugged embodiment of a welding diagnostic device with a simple set up that requires only two leads, a positive lead and a ground lead, to be connected to the power source of the welding machine that is doing the welding. The TMI 200 interfaces with the GMAW machine using the pair of voltage leads and reads the welding voltage using the voltage sensor 250 that is communicatively coupled to the DAS 260. The DAS 260 can acquire data from the welding voltage, process the data and generates three types of output to indicate the metal transfer mode of the weld being performed: documentation in the form of a digital post-weld report and/or live weld data, lights that visually indicate the presence or absence of SC, and an audible warning to indicate the presence of SC. The DAS 260 can acquire the welding voltage data at a particular sampling rate. In some embodiments, the welding voltage data is acquired at a sampling rate that is at least five times as great as the fast waveform frequency of the welding machine.

FIG. 3 illustrates an embodiment of a method 300 of determining a metal transfer mode of a welding process carried out according to the principles of the disclosure. The method 300 may be carried out by a DAS as disclosed herein, such as the DAS 140 or the DAS 260. The method 300 may represent an algorithm that is implemented as a series of operating instructions stored on a non-transitory computer readable medium that directs the operation of a processor when initiated thereby. The method 300 begins in a step 305.

In a step 310, a welding voltage is acquired. The welding voltage can be acquired through a single pair of leads that are connected to the power terminals of the welding machine being used. The welding voltage can be received by a welding diagnostic device such as described herein. In one embodiment, a voltage sensor is employed to receive the welding voltage. The welding voltage can then be provided to a DAS.

A threshold is obtained in a step 320. In one embodiment, the threshold is a calculated threshold based on the welding voltage. In one embodiment, a percentage of an average of the welding voltage can be employed as a calculated threshold. The average can be obtained over a designated amount of time that can vary depending on the application. In some embodiments, the average is a moving average that is calculated for each of a particular time period. In one embodiment, a percentage of fifty percent of the average voltage is used as the calculated threshold. The particular percentage can vary in various applications. Instead of a calculated threshold, a predetermined threshold can be obtained. The predetermined threshold can be an experimentally determined constant based on, for example, material type, thickness, and welding consumable In a step 330, a determination is made of the number of times the welding voltage drops below the threshold. As such, the number of transitions of the welding voltage across the threshold is determined. In some embodiments, the number of threshold crossings are determined per a designated amount of time.

A metal transfer mode is then determined in step 340 by comparing the number of determined drops below the threshold to a defined limit. In some embodiments, the metal transfer mode is determined based on if the defined limit associated with the metal transfer mode is less than the number of determined drops below the calculated or predetermined threshold. Considering a GMAW machine, an SC mode, globular mode and spray mode can be associated with defined limits. The defined limits can be based on statistical data obtained during welding processes and post-welding analysis. The defined limits for different metal transfer modes can vary according to material types, material thickness, weld positions and weld consumables. In some embodiments, the identified modes are provided via sensory indications during the welding process. The method 300 ends in a step 350.

At least part of the above-described apparatuses, such as a DAS, or methods may be embodied in or performed by various conventional digital data processors, microprocessors or computing devices, wherein these devices are programmed or store executable programs of sequences of software instructions to perform one or more of the steps of the methods, e.g., steps of the method of FIG. 3. The software instructions of such programs may be encoded in machine-executable form on conventional digital data storage media that is non-transitory, e.g., magnetic or optical disks, random-access memory (RAM), magnetic hard disks, flash memories, and/or read-only memory (ROM), to enable various types of digital data processors or computing devices to perform one, multiple or all of the steps of one or more of the above-described methods, e.g., one or more of the steps of the method of FIG. 3. Additionally, an apparatus, such as welding diagnostic device or a transfer mode indicator, may be designed to include the necessary circuitry or programming to perform each step or at least some of the steps of a method disclosed herein.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the present disclosure has been described in detail, those skilled in the art should understand that they can make various changes, substitutions and alterations herein without departing from the spirit and scope of the disclosure in its broadest form.

We claim:
1. A welding diagnostic device for use with a welding machine during a welding process, comprising:
 a welding data interface configured to receive a welding voltage from a welding machine during a welding process;
 viewable identifiers configured to visually indicate metal transfer modes during said welding process;
 a voltage sensor configured to read said welding voltage from said welding data interface; and a data acquisition system configured to, during said welding process, determine a transfer mode threshold based solely on an average of said welding voltage, determine a metal transfer mode of said welding process based on transitions of said welding voltage across said threshold, and provide a sensory indication thereof, wherein said voltage sensor is configured to provide said welding voltage to said data acquisition system.

2. The welding diagnostic device as recited in claim 1 wherein said sensory indication is a visual indication.

3. The welding diagnostic device as recited in claim 1 further comprising an auditory alarm configured to provide an audible indication that corresponds to a type of said metal transfer mode.

4. The welding diagnostic device as recited in claim 1 wherein said welding voltage is acquired at said welding machine.

5. The welding diagnostic device as recited in claim 1 wherein said diagnostic acquisition system is configured to determine a number of drops of said welding voltage below said threshold and to determine said metal transfer mode based on said number of drops.

6. The welding diagnostic device as recited in claim 1 wherein said diagnostic acquisition system is further configured to generate a report based on said voltage data, said diagnostic device further comprising output circuitry configured to provide an interface for retrieving said report.

7. A method of identifying a metal transfer mode of a welding process presently being performed, comprising:
   analyzing a welding voltage obtained, employing a voltage sensor, from a welding machine during a welding process;
   determining a threshold during said welding process solely from an average of said welding voltage;
   determining, employing a processor, a number of voltage drops of said welding voltage below said threshold in a designated amount of time that corresponds to said welding process;
   identifying a metal transfer mode of said welding process performed by said welding machine based on said number of voltage drops; and
   providing at least one sensory indication of said metal transfer mode employing a viewable identifier.

8. The method as recited in claim 7 further comprising providing different types of sensory indications of said metal transfer mode.

9. The method as recited in claim 7 further comprising receiving said welding voltage from leads connected to power terminals of said welding machine at said welding machine.

10. The method as recited in claim 7 wherein said threshold is fifty percent of said average of said welding voltage.

11. The method as recited in claim 7 wherein said average of said welding voltage is a moving average.

12. The method as recited in claim 8 wherein said identifying and said providing occur during said welding process in real time.

13. The method as recited in claim 7 wherein said welding machine is a GMAW machine and said metal transfer mode is a short circuit mode.

14. A transfer mode identifier for use with a welding machine, comprising:
   a welding data interface configured to receive a welding voltage from power terminals of said welding machine during a welding process;
   a voltage sensor configured to read said welding voltage from said welding data interface;
   a data acquisition system configured to, during said welding process, determine a threshold solely from an average of said welding voltage, determine a number of drops of said voltage below said threshold in a designated amount of time, and determine metal transfer modes of said welding process based on said number of drops, wherein said data acquisition system is configured to determine said threshold over a particular amount of time that corresponds to said welding process;
   a viewable identifier configured to visually indicate said metal transfer modes in real time during said welding process; and
   a voltage sensor configured to read said welding voltage from said welding data interface and provide said welding voltage to said data acquisition system.

15. The transfer mode identifier as recited in claim 14 having a case, wherein said data acquisition system and said voltage sensor are located within said case and said welding data interface is externally accessible from said case.

16. The transfer mode identifier as recited in claim 14 wherein said metal transfer modes identified by said data acquisition system are a short circuit mode, a globular mode and a spray mode, said viewable identifier including three lights that provide different colors that each uniquely correspond to one of said metal transfer modes.

17. The transfer mode identifier as recited in claim 14 wherein said number of drops are determined independent of a value of said welding voltage.

18. The transfer mode identifier as recited in claim 16 wherein said diagnostic acquisition system is configured to determine said metal transfer modes by comparing said number of drops to predetermined ranges that classify said number of drops as either said short circuit mode, said globular mode, or said spray mode.

19. The transfer mode identifier as recited in claim 18 further comprising communication circuitry configured to receive input data for said data acquisition system, wherein said input data includes said predetermined ranges and said predetermined ranges are based on material type, material thickness, weld positions, and weld consumables of said welding process.

* * * * *